April 23, 1968     M. SCHONBERGER     3,379,063

TEMPERATURE MEASURING APPARATUS

Filed Feb. 3, 1965     2 Sheets-Sheet 1

INVENTOR
MILTON SCHONBERGER
By Joseph Hirschman
ATTORNEY

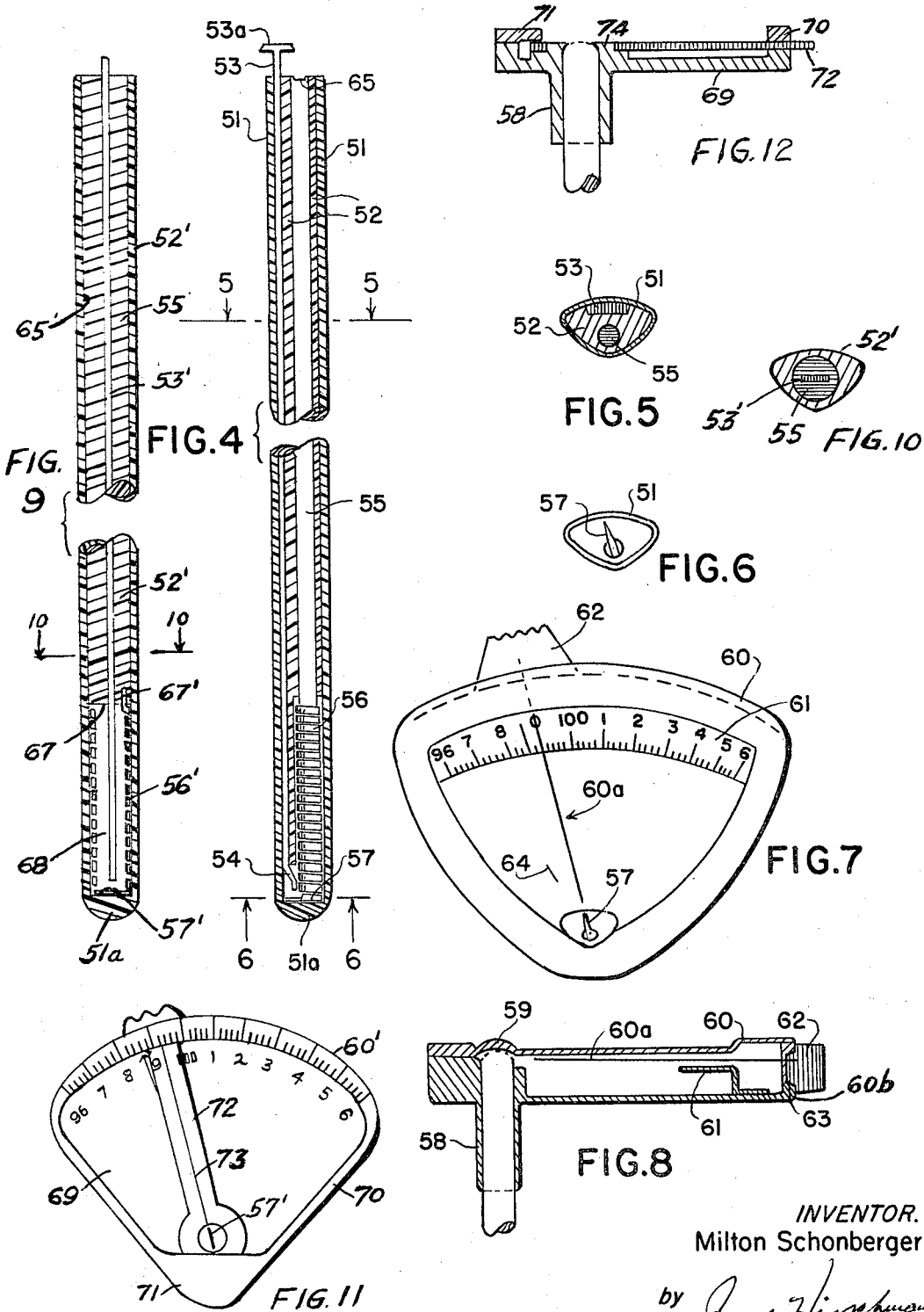

United States Patent Office 3,379,063
Patented Apr. 23, 1968

3,379,063
TEMPERATURE MEASURING APPARATUS
Milton Schonberger, Washington Township, N.J., assignor to I.N.M. Industries Corporation, New York, N.Y., a corporation of Delaware
Continuation-in-part of application Ser. No. 280,344, May 14, 1963. This application Feb. 3, 1965, Ser. No. 431,771
14 Claims. (Cl. 73—362)

ABSTRACT OF THE DISCLOSURE

A temperature measuring system in which a non-indicating heat receptor or probe is placed in heat-absorbing relation with a body or region whose temperature is to be measured, the receptor or probe storing heat at the temperature to be measured by means of a non-conducting mass of high heat capacity or by way of the rotation of a bimetallic coil. The receptor or probe being then not connected to a temperature indicating device is subsequently brought into temperature indicating relation with such device, whereby the receptor or probe in a clinical thermometric system can be disposable.

---

The present application is a continuation-in-part of my copending application Ser. No. 280,344, filed May 14, 1963, and entitled "Apparatus for Measuring Temperature," now abandoned.

The present invention relates to apparatus for measuring temperature, and more particularly to a heat-measuring system which includes a heat collector or receptor which can me made cheaply enough to be disposable after a single use and which is adapted to be exposed to the heat of the body whose temperature is to be measured and a separate meter for measuring and indicating in terms of degrees of temperature the attained condition of the receptor resulting from the absorption of heat.

While the invention is of general applicability in various fields, it is particularly advantageous in the form of a fever thermometer and will accordingly be described in detail in connection with a disposable hospital thermometric heat-receptor probe.

One of the serious limitations of the common glass-enclosed mercury fever thermometers is their relatively high cost which makes re-use necessary and hence their sterilization prior to re-use. However, they cannot be sterilized by the simple process of heating, and the use of sterilizing liquids is not entirely reliable, besides being frequently inconvenient and always time-consuming. Doctors and nurses in hospitals must accordingly provide themselves with a large supply of thermometers when they are to attend to a number of patients, and the thermometers must be sterilized after each use.

Also, the usual glass-enclosed thermometers are easily broken, so that they present an item of considerable expense in a hospital or clinic.

The present invention provides an inexpensive form of heat absorbing device which, being disposable after the change in its condition has been translated into degrees of temperature by the separate measuring apparatus, eliminates the necessity for sterilization while at the same time insuring the use of a fresh and completely sterile device for the measurement of a patient's temperature; while in a modified form of the invention, the heat-receptor probe can be heat-sterilized in a simple and reliable manner and re-used.

According to the present invention, the heat-measuring apparatus is composed of two separate parts, one part being the heat collector or heat receptor probe which in use is allowed to reach the temperature of the human body (or any other body or material whose temperature is to be measured), while the other part constitutes the actual measuring device or meter. The heat collector in one of the embodiments of the invention described below serves only the function of collecting and storing for a short time a quantity of heat at the temperature of the measured body, and such heat collector is then inserted in the measuring device which includes an electric circuit containing a thermistor whose characteristic is such that its resistance drops rapidly even with a small rise in temperature. On bringing the heat collector into contact, i.e., in heat-conducting relation, with the thermistor, the resistance of the thermistor circuit is reduced to a degree depending upon the rise in temperature, so that upon closing of a switch which connects an electric cell or battery into the circuit, the current will rise in proportion to the temperature of the heat collector, the current rise being amplified sufficiently to operate a microammeter.

As the heat collector serves only the function of collecting and storing the heat of the body or object whose temperature is to be measured, it can be made so cheaply that it can be discarded after a single use. It can be constructed of various materials to the end that it retains such a quantity of heat at the temperature level of the body being measured, that in the few seconds necessary to transfer it from the point of heat collection to the meter, no substantial loss of heat occurs. In general, the heat collector will be of sufficient size and composed of such material that a relatively large amount of heat is required to raise its temperature by one degree, i.e., it has a high specific heat. The heat collector may also include, but not necessarily, a heat conducting body of relatively large area which is to come into direct contact with the thermistor in order to transfer heat to the latter as quickly as possible. The thermistor is characterized by a low specific heat, so that the transfer of a relatively small portion of the heat contained in the collector is sufficient to raise the temperature of the thermistor to that of the collector or probe.

In a modified form of the invention the heat-gathering member or receptor converts the absorbed heat into rotation of a metallic coil, preferably bimetallic, of known form and constitution, the angular displacement or degree of rotation of a free end thereof being measured in a read-out device having a temperature, scale and an index member or pointer which is set in correspondence with the degree of angular displacement of the coil and by reference to a fixed norm or zero point so as to indicate on the scale the temperature which the heat receptor has reached. In a preferred form of this embodiment of the invention means are provided for fixing the free or movable end of the coil in its maximum deflected position, so that the determination of the actual temperature need not be made promptly but can await the convenience of the doctor or nurse or other attendant.

The invention will be further described with the aid of the accompanying drawings wherein FIG. 1 is a perspective view of the indicating meter and shows the opening through which the heat collector or receptor is inserted, there being shown also the receptor in position for insertion into the meter;

FIG. 4 illustrates a modified form of the invention and is a longitudinal section through the heat collector or receptor which includes a coil metallic element;

FIG. 5 is a transverse section along the line 5—5 of FIG. 4 on an enlarged scale;

FIG. 6 is a section taken along the line 6—6 of FIG. 4, likewise on an enlarged scale;

FIG. 7 shows a face view of a modified form of metering or read-out device for translating the angular movement of the metallic coil into degrees of temperature;

FIG. 8 is a section along the pointer of the metering or read-out device and shows the receptor in position therein;

FIG. 9 illustrates a variation of the heat receptor structure of FIG. 4 in central longitudinal section;

FIG. 10 is a transverse section of the receptor along the line 10—10 of FIG. 9;

FIG. 11 is a face view of the modified temperature indicating meter; while

FIG. 12 is a section showing the receptor in position in the metering device.

Figure 1:
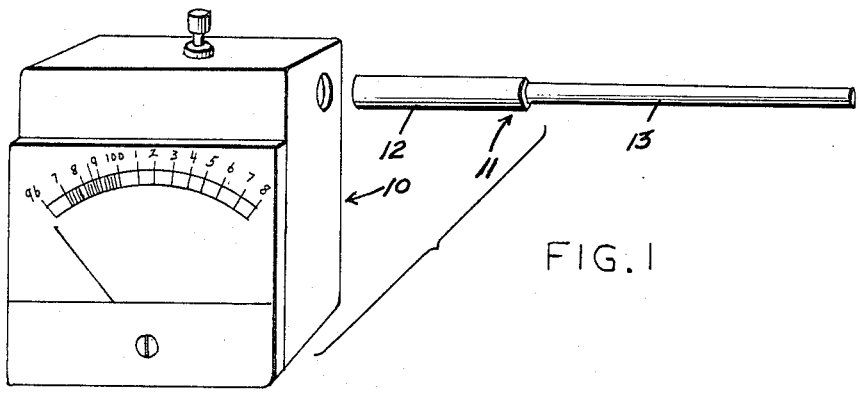

Referring to the drawings, the measuring apparatus consists essentially of two parts, namely, the actual temperature measuring or indicating member, herein sometimes termed a "read-out" device, which in the embodiment shown in FIG. 1 is in the form of a micro- or milliammeter 10, and a heat collector or receptor shown in FIG. 1 at 11. The heat receptor, in the form of the invention illustrated in FIG. 1, consists of a tubular portion 12 and an integral handle portion 13, both of which are made of a suitable resinous or plastic material, such as polyethylene, polypropylene, or other suitable plastic. Fitted snugly within the tubular portion 12 is an elongated metallic sleeve or eyelet 14 having a central body portion 15 which terminates at both ends in enlarged circular heads or outwardly extending flanges 16 which engage the inner surfaces of the tube 12, thereby providing an annular air space 17 between the main body portion 15 of the eyelet and the inside surface of the tube 12. The outer head 16 of the eyelet is preferably spaced a short distance from the outer or free end of the tube 12 in order to provide an insulating air space in advance of the eyelet.

The meter 10 is provided with an opening 18 leading into chamber 19 which can be made removable for cleaning. Within the chamber 19 there is mounted as on a crosspiece 20, a thermistor 21 from which run leads 22, 23 (FIGS. 2 and 3) which are connected into a circuit which will shortly be described. The thermistor is provided with a head 23' of a shape and size to which the internal dimensions of the central portion 15 of the eyelet correspond. Upon insertion of the heat collector 11 into the chamber 19, the thermistor head 23' will snugly engage the metallic tubular portion 15 of the heat collector and thereby establish a path of relative high heat conductivity to the thermistor wire or coil contained within the head 23'.

Figure 3A:
FIG. 3a shows a modified form of receptor.
Figure 3:
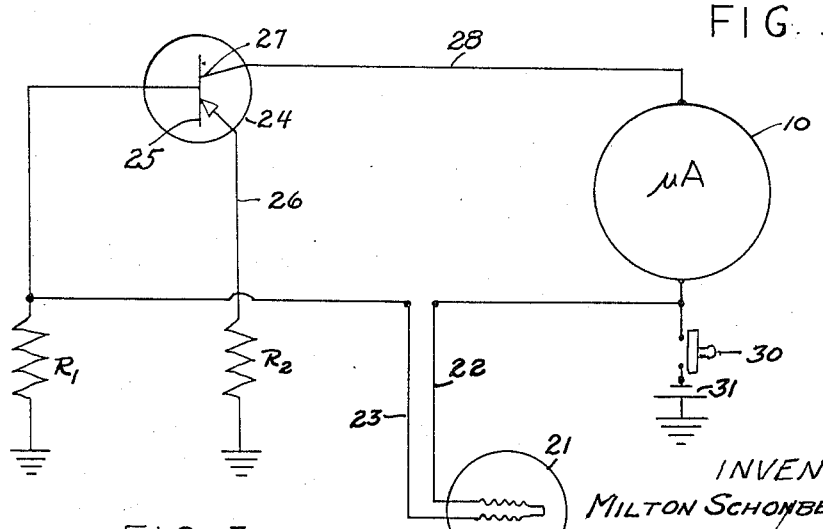
FIG. 3 is a diagram showing the thermistor circuit of the meter.

FIG. 3 shows the electrical amplifying circuit into which the leads 22 and 23 of the thermistor are connected. The circuit includes an amplifying device, preferably in the form of a transistor 24 whose plate 25 is connected through a resistance $R_1$ to ground while the emitter 26 is similarly grounded through a resistance $R_2$ which, like resistance $R_1$ is of the order of about 180 ohms. One or both of these resistors can be made variable to facilitate calibration of the circuit and for making adjustments of the relative magnitudes of the resistors.

The collector 27 of the transistor is connected by lead 28 to the meter 10 which, in case of use as a fever thermometer can be a 50 μa. (microampere) meter. The circuit can be powered by a single electric cell 31 whose one terminal is grounded while the other is connected through a spring-biased press switch 30 to the meter 10 and to the thermistor 14.

The transistor 24 can be of the P-N-P or N-P-N type and is preferably a power transistor of the type employed for audio amplification.

The operation of the above-described device is as follows:

When the apparatus of the invention is used as a fever thermometer, the heat collecting and storing device 11 is placed in the oral or rectal cavity and allowed to remain until is has reached the body temperatures. This will usually require about one minute. It is then removed and inserted into the chamber 19 of the meter 10 where the metallic eyelet 14 is fitted in heat conducting relation over the rod-like thermistor 21. Preferably, the switch 30 is depressed a few seconds before the collector is applied to the thermistor in order to bring the latter to a base temperature of 93 to 95° C., the thermistor being of a type which at a voltage of 1.4 volts does not become heated beyond about 95° F. Upon rise of the thermistor temperature to that of the heat receptor, its resistance falls and the current rises. This rise in current is amplified and the amplified current operates the pointer of the ammeter which plays over a suitably calibrated temperature scale. The heat collector 11 is then removed and discarded.

The heat of the body being measured is absorbed not only by the tube 12, the mass of air in the forward space 14, the eyelet 15, and the air in the cylindrical space within the eyelet, but also by the air in the more or less cylindrical space 14' between the inner eyelet head 16 and the closed end 12' of the tube. The air space between the outer end of the eyelet and the open end of the tube serves to insulate the eyelet. The heat capacity of the collector is so much greater than that of the thermistor head that the latter reaches the temperature of the collector without any material drop in the temperature of the collector. The apparatus can accordingly be easily so constructed as to be accurate within about 0.1° F., and by the use of two thermistors can be made accurate up to about 0.001° F.

It will be evident that any saliva or fecal matter that is retained by the heat collector will not interfere with the temperature measurement; on the contrary, by increasing the mass of matter at the temperature to be measured, it will contribute to the accuracy of the measurement. As will readily be understood, the larger the mass of the heat collector, the longer will be the time that the reading will remain steady on the meter.

The tubular portion of the heat collector should be of a size that can be conveniently placed under the tongue in the case of oral temperature measurement, a length of about ½ to 1 inch and an external diameter of about ⅓ inch being satisfactory. The plastic tube can be about 0.03 inch thick, and it will be noted that the length of the metallic eyelet is considerably greater than the length of the thermistor head which it engages. The length of the thermistor stem or rod should be such that the head 23' penetrates to about the center of the eyelet.

The chamber 19 with the thermistor is preferably made removable for periodical cleaning, and the thermistor may be made detachable from the crosspiece 20 to facilitate such cleaning.

While I prefer to make the heat collector or receptor in the form of a disposable unit (after a single use), as it can be manufactured very cheaply on a large scale, and can be packaged in sterile form in a sealed plastic or similar bag or container, it is evident that it can also be re-used after sterilization, as it can be composed of parts which, unlike the well-known mercury thermometers, are not destroyed by sterilizing temperatures.

It may sometimes be desirable to roughen slightly the inner surface of the metallic or other heat-conducting eyelet and also the outer surface of the thermistor head. This can be done by light sand-blasting and aids in eliminating or disrupting any adhering insulating film, and promotes better heat conduction from the eyelet to the thermistor.

The crosspiece 20 may be in the form of a bar, but can more conveniently be made of a disc of more or less rigid material. Forwardly of the disc there can be positioned a relatively soft and resilient disc 20' of rubber or the like to absorb any shock on insertion of the heat collector 11.

Figure 2:
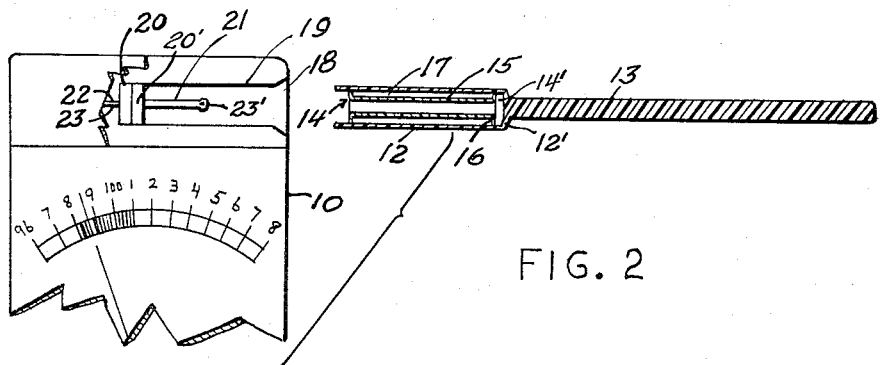
FIG. 2 shows the heat collector or receptor and the thermistor-containing portion of the meter in central longitudinal section.

In FIG. 3a there is shown a modified form of heat receptor which, like that shown in FIGS. 1 and 2, is composed of a handle portion 13 and a heat receiving portion 32 of somewhat larger external diameter than the portion 13. The portion 32 is preferably cylindrical in shape and is tubular toward its outer end; as in the already described embodiment it can be made integral with the handle 13 and moulded of any suitable plastic, such as polyethylene or polypropylene, and also of polystyrene, various copolymers and the like. The hollow portion 33 is open to the atmosphere at its terminus. The hollow interior space 33 is filled with a highly viscous or semi-solid material which is easily penetrable by the thermistor 21, and which is preferably non-flowing within the temperature range to be measured. A suitable material of this type is petrolatum (petroleum jelly); however, other non-toxic materials such as semi-solid gums, resins, gels, thickening agents, and the like, can be employed. Where the material is of a type which becomes mobile at the temperature range to be measured, it may be rendered less fluent by mixing with powdered non-toxic materials, preferably of a poor heat conducting characteristic, such as powdered calcium carbonate, clays, pumice, starch, and the like. With such powdered materials there can even be employed also more or less liquid materials which are thereby rendered non-fluent, such as oils of various kinds, like olive and coconut oils. Petrolatum is a highly satisfactory material because of its non-toxicity, poor thermal conductivity and relatively high heat capacity. Polyethylene is a very satisfactory material for the receptor because of its relatively high specific heat (0.52 cal./g.). When the material 34 is of unpleasant taste or odor, the open end of the space 33 can be sealed by a film 35 which is not pervious to the contents 34 of the space 33, such film being punctured by the thermistor when the receptor is inserted in the read-out device 10. Thus the film can be of a suitable plastic material and can be either solvent- or heat-sealed or adhesively sealed to the end portion of the receptor. In addition to its high heat capacity, this type of receptor has the further advantage of intimate contact with the thermistor both at its head and along its stem.

The present invention also contemplates (within its broad concept of the use of a heat collector or receptor and a separate read-out device for converting the changed condition of the receptor into degrees of temperature) the provision of a receptor which not only collects heat until it attains the temperature of the body whose temperature is to be measured, but converts the absorbed heat into mechanical movement of a heat-responsive element whose degree of movement or deflection or the like is then measured in the read-out device which converts the changed condition of the receptor into a temperature reading. In a satisfactorily tested form of this apparatus, there is employed a metallic coil fixed at one end to a plastic holder and free at its other end to rotate or become angularly deflected in response to the rise in temperature. To obtain a high degree of deflection or rotation per unit of temperature, there is preferably employed a bimetallic coil of various types which are known and available on the market. To facilitate measurement of the degree of rotation of the free end of the coil, its end portion is bent so as to extend through the diameter of the coil, such end portion being rotated angularly in proportion to the intensity of the heat absorbed by the coil. Means may be provided to fix the angular position of the coil end at its maximum deflection, and the receptor then brought at any convenient time to the metering or read-out device which in this case is a means for measuring the degree of deflection of the coil end.

Referring to the embodiment illustrated in FIGS. 4 to 8, the heat receptor is shown as comprising an outer casing 51 formed as an open-ended tube of glass or transparent plastic whose bottom end 51a is closed and of thickened convex shape to act as a magnifying lens for a purpose which will appear hereinafter.

The casing 51 is of non-circular shape, as shown in FIGS. 5 and 6, and receive with a snug fit a sleeve or carrier 52 of similar shape in cross-section. The carrier has a longitudinal bore which receives and holds frictionally in adjusted position a rod 55, the carrier being grooved to receive a plunger 53 which can be depressed when finger pressure is applied to its free end 53a, the plunger being held in depressed condition by friction. The lower end of the plunger is offset, as shown at 54 in FIG. 4. To the end of the rod 55 there is permanently fixed one end of a bimetallic, temperature-responsive coil 56 whose free end is shaped in the form of a pointer 57 which preferably passes through the axis of the coil.

The receptor unit can be assembled as follows:

One end of the bimetallic coil 56 having been fixed to the rod 55, the latter is then inserted into the longitudinal bore in carrier 52. The plunger 53 is then slid into place within the groove provided in the carrier. The whole assembly is now inserted into the outer casing 51. The rod 55 is equipped at its outer end with a slot 65, so that the unit, after assembly, may be calibrated for any variation in thickness or in other physical properties of the bimetallic coil in the manner described below. FIG. 6 presents a view of the pointer as seen through the magnifier 51a in a deflected position.

The receptor 51 is adapted to be read with the aid of a meter or read-out device 60 (FIGS. 7 and 8) which is provided with a temperature scale 61 over which moves a pointer 60a controlled by a slide 62 to which it is attached. The slide fits within a depressed portion of the upper end of the frame 60b as shown in FIG. 8, the pointer passing through a slot in such depressed portion. The meter is provided with a tubular member 58 of the same cross-section as receptor 51 and within which the receptor fits snugly with its pointer 57 visible through a window 59 which is preferably convex to provide additional magnification.

The receptor is calibrated in terms of the scale 61 by inserting the receptor in an environment of a predetermined temperature, for instance, 100° F. and then adjusting the rods 55 by means of a screw driver or other tool which is engaged in the slot 65, so that the pointer 57 is caused to "point" toward the 100° F. mark on the scale. The scale itself is calibrated according to the average heat expansion characteristic of the coils.

The mode of operation of the temperature measuring apparatus shown in FIGS. 4 to 8 is as follows: The lower end portion of the receptor, as shown in FIG. 4, is inserted into a body orifice and after one or more minutes, when the coil 56 has attained its maximum expansion, the plunger 53 is depressed so that the pointer 57 is firmly clamped between the bottom wall of the casing 51 and the lower end of the offset portion 54 of the plunger. The bimetallic coil is of such light construction that it can not overcome the pressure of the plunger despite the fact that the latter is held in depressed condition only by friction. The receptor is then removed and inserted into the tubular member 58 of the read-out device 60. As the receptor has been calibrated by adjustment of the rod 55 and hence also of the bimetallic coil with reference to the scale 61 the angular position of pointer 57 will give a correct indication of the temperature on the scale 61. It is then necessary only to "sight" the pointer 57 position with reference to the scale 61. This is accomplished by adjusting the slide 62 to which the pointer 60a is fixed and which rides over the scale 61 until the pointers 60a and 57 are directly in line with each other. The temperature is then read off the scale 61.

The pointer 60a is positioned at a right angle to the arc of the scale and of the slide 62. Should the 90° mounting of the pointer 60a be disturbed, as by dropping of the meter or by some other mishap, means is provided for quickly checking its accuracy. This is shown in the form of a radial mark 64 on the face of the scale. As illustrated, the mark 64 registers with the numeral 7 (97°) on the scale. If the pointer 60a should fail to be in line with the scale number 7 and with mark 64, then the user will be aware that the read-out device should be readjusted.

The receptor of FIG. 4 can be disposable, i.e., it can be made cheaply enough so that it can be discarded after each use; or it can be employed repeatedly with the same patient, as in a hospital, and then discarded when the patient is discharged. However, as the metallic coil and also the plastic parts of the receptor can withstand sterilizing temperatures, it will be evident that the receptor can be sterilized for re-use in a manner that is impossible for mercury and other liquid-type thermometers.

In the form of the invention shown in FIGS. 9 to 12, in which parts corresponding to those of FIGS. 4 to 8 are identified by similar reference characters, the tubular member 51 of FIGS. 4 and 5 is eliminated. The glass or plastic stem or sleeve 52' is of non-circular cross-section, and constitutes the outer member. The stem 52' is provided with a circular, symmetrically disposed longitudinal bore 65', within which is disposed a frictionally held circular rod 55 of plastic material, such rod terminating at some distance from the bottom of the stem, as indicated at 67, so that a hollow space 68 is provided between the bottom of the rod and the bottom of the stem, such space being closed by a transparent plano-convex mass 51a similar to that shown in FIG. 4.

Within the space 68 there is disposed the heat-expansible metallic coil 56' of known constitution similar to but of larger diameter than the coil 56 of FIG. 4. The upper end of the coil is fixed to the bottom end portion of the rod 55, as indicated at 67', while its lower end is free. The free end portion of the coil is bent so as to pass through the longitudinal axis of the coil, for a purpose which has already been explained in connection with FIG. 4.

Passing centrally through an axial bore in the rod 55 is a bar or plunger 53' whose bottom end is in close proximity to the diametral extension 57' of the coil, as shown in FIG. 9. The plunger 53' is so disposed that in all the angular positions of the extension 57' it overlies the latter, so that upon depression of the plunger, it will clamp the portion 57' of the coil against the bottom of the stem. The bar 53' is not provided on its top end with a gripping means, such as the flat horizontal portion shown at 53a in FIG. 4 which enables the plunger 53 to be withdrawn after a coil deflection has been measured, and the receptor then re-used; on the contrary, the plunger 53' of FIG. 9 has no enlarged portion at its upper end, so that once it is depressed, its top end being then flush with the top of stem 52', it can not be withdrawn, and the receptor can not be re-used; i.e., it must be discarded.

It will be apparent from the foregoing that my invention can readily be adapted for the measurement of temperatures in other ranges than are encountered in the case of patients with fever. Thus, the heat collector can be employed in situations wherein it would be inconvenient or too expensive to employ the usual thermometers, as where temperature readings of a large number of solutions must be taken, or where the temperature range is beyond that which can be measured directly with an alcohol or mercury thermometer. At very high temperature ranges (i.e., above the melting or decomposition temperature of plastic materials) the collector can be made of ceramic or other high heat-resisting materials.

I claim:

1. A disposable hospital thermometric heat-receptor probe useful in determining a patient's temperature as herein described, comprised of a nontoxic unitary rodlike molded-plastic body having a stem handle terminating in a tubular end portion filled with a nontoxic semisolid viscous heat-receiving material, said material being accessible to and easily penetrable by separate temperature measuring means; the dimensions and thermal properties of the components being such that the probe can be comfortably placed in a patient's body cavity similarly to a conventional thermometer and such that the viscous heat-receiving material will reach adjacent body temperature in a conveniently short time and yet upon removal of the probe from the body will maintain such temperature and permit of measurement thereof to thereby determine the patient's temperature.

2. A thermometric probe according to claim 1, in which the molded-plastic body is polyethylene and the heat-receiving filler material is semisolid petrolatum that is nonflowing in the range of temperatures to be measured.

3. Temperature measuring apparatus comprising a heat receptor adapted to be placed in heat-receiving relation to a region whose temperature is to be measured and to collect and store heat at substantially the temperature of the region to be measured, and a meter device separate from said receptor and responsive to the condition of the receptor when the latter is brought into measuring relation therewith, said device being provided with means for giving a visual indication of the temperature attained by said receptor and comprising a low current ammeter having an electrical circuit responsive to the temperature of the receptor, said meter being provided with a chamber having disposed therein a thermistor in the form of a rod-like element, said receptor including a tubular portion adapted to fit over said thermistor in heat-conducting relation, said electric circuit having means for supplying electric current thereto, and a switch therein biased to open position and adapted to be closed to supply current while the receptor is temporarily fitted over the thermistor.

4. Apparatus according to claim 3, in which the tubular member is composed of plastic material, and is provided with a metallic element disposed within said tubular member and adapted to engage in heat-conducting contact with the thermistor.

5. Apparatus according to claim 3, in which the tubular member is composed of plastic material, and is provided with a metallic element disposed within said tubular member and adapted to engage in heat-conducting contact with the thermistor, the metallic element being spaced from the tubular portion of the heat collector to provide a trapped annular body of air within said tubular portion.

6. Apparatus according to claim 5, wherein the metallic element is an eyelet having a main body portion and an enlarged head at least at the outer end thereof to provide an annular head at least at the outer end thereof to provide an annular space between said body portion and the said receptor tubular portion, the outer end of the eyelet being spaced from the adjacent end of said tubular portion, the opposite end of the latter being closed.

7. A heat collecting and storing device comprising a tubular member of poor heat-conducting material adapted to be fitted over a rod-like thermistor in an electrical measuring circuit, said tubular member being formed of plastic material and having disposed therein a substantially cylindrical element radially spaced from the inner wall thereof to provide an annular body of air trapped between the tubular member and the cylindrical element.

8. A device according to claim 7, wherein the cylindrical element is in the form of a metallic eyelet.

9. A device according to claim 7, wherein the cylindrical element is in the form of a metallic eyelet whose outer end is spaced from the adjacent end of the tubular member, the opposite end of the latter being closed.

10. A receptor for receiving heat from a body whose temperature is to be measured and comprising a member having a heat-receiving end portion, said end portion being hollow and open at its terminus and containing an easily penetrable material of relatively low heat conductivity and high specific heat, said receptor being devoid of temperature measuring and indicating mechanism and being shaped to interfit bodily with a complementarily shaped part of a measuring and indicating device.

11. A heat receptor according to claim 10, wherein said easily penetrable material has a low flow characteristic within the temperature range to be measured.

12. A heat receptor according to claim 10, wherein the easily penetrable material is petrolatum.

13. A low current ammeter comprising a casing, an electrical circuit within said casing including a source of current, a thermistor in series with said source of current, and a chamber within said casing open to the atmosphere, a socket member within the chamber, the thermistor being secured on said socket member in spaced relation to the inside wall of the chamber, and a resilient, shock-absorbing washer mounted on the thermistor forwardly of the socket member.

14. An ammeter according to claim 13, wherein the chamber is removable bodily from the ammeter.

References Cited

UNITED STATES PATENTS

| | | | |
|---|---|---|---|
| 2,919,580 | 1/1960 | McConnell | 73—362 |
| 3,081,628 | 3/1963 | Salera | 73—362 |
| 3,187,576 | 6/1965 | Beeston | 73—362 |
| 3,191,437 | 6/1965 | Heard | 73—359 |
| 3,260,114 | 7/1966 | Drolet | 73—362 |

LOUIS R. PRINCE, *Primary Examiner.*

N. B. SIEGEL, *Assistant Examiner.*